United States Patent
Chae

(10) Patent No.: US 12,299,099 B2
(45) Date of Patent: May 13, 2025

(54) METHOD AND APPARATUS FOR CONTINUOUS AUTHENTICATION

(71) Applicant: NOTA, INC., Daejeon (KR)

(72) Inventor: Myungsu Chae, Daejeon (KR)

(73) Assignee: NOTA, INC., Daejeon (KR)

( * ) Notice: Subject to any disclaimer, the term of this patent is extended or adjusted under 35 U.S.C. 154(b) by 405 days.

(21) Appl. No.: 17/843,520

(22) Filed: Jun. 17, 2022

(65) Prior Publication Data

US 2022/0318358 A1  Oct. 6, 2022

Related U.S. Application Data

(63) Continuation of application No. PCT/KR2020/001076, filed on Jan. 22, 2020.

(30) Foreign Application Priority Data

Dec. 18, 2019 (KR) .................. 10-2019-0170112
Jan. 22, 2020 (KR) .................. 10-2020-0008275

(51) Int. Cl.
*G06F 21/32* (2013.01)
*G06T 7/246* (2017.01)
(Continued)

(52) U.S. Cl.
CPC .............. *G06F 21/32* (2013.01); *G06T 7/248* (2017.01); *G06T 7/70* (2017.01); *G06V 40/172* (2022.01);
(Continued)

(58) Field of Classification Search
CPC . G06F 21/32; G06T 7/248; G06T 7/70; G06T 2207/10016; G06T 2207/20081;
(Continued)

(56) References Cited

U.S. PATENT DOCUMENTS

2003/0227439 A1* 12/2003 Lee .................. H04N 21/42202
345/156
2005/0147292 A1* 7/2005 Huang .................. G06F 18/254
382/218
(Continued)

FOREIGN PATENT DOCUMENTS

JP  2012-003686 A  1/2012
JP  2018-181157 A  11/2018
(Continued)

OTHER PUBLICATIONS

International Search Report mailed Sep. 11, 2020, issued in corresponding International Application No. PCT/KR2020/001076, filed Jan. 22, 2020, 4 pages.

*Primary Examiner* — Abdulkader M Alriyashi
(74) *Attorney, Agent, or Firm* — Christensen O'Connor Johnson Kindness PLLC

(57) ABSTRACT

Disclosed are a method and apparatus for continuous authentication. An authentication method includes receiving image frames taken by a camera in succession, detecting a face area in the image frames, tracking a change in a location of the detected face area in the image frames, and performing continuous user authentication for the face area according to the change in the location by using the face area whose change in the location has been tracked and a deep learning model.

14 Claims, 3 Drawing Sheets

(51) Int. Cl.
*G06T 7/70* (2017.01)
*G06V 40/16* (2022.01)
(52) U.S. Cl.
CPC .............. *G06T 2207/10016* (2013.01); *G06T 2207/20081* (2013.01); *G06T 2207/30201* (2013.01)
(58) Field of Classification Search
CPC ........ G06T 2207/30201; G06V 40/172; G06V 20/52; G06V 40/161
See application file for complete search history.

(56) References Cited

U.S. PATENT DOCUMENTS

2015/0379332 A1* 12/2015 Matsunaga .......... G06V 40/172
348/77
2017/0076078 A1* 3/2017 Kim .................... G06V 40/172
2019/0370529 A1* 12/2019 Kumar ..................... G06T 7/74

FOREIGN PATENT DOCUMENTS

| KR | 10-0809044 B1 | 3/2008 |
| KR | 10-2012-0139100 A | 12/2012 |
| KR | 10-2018-0109634 A | 10/2018 |
| KR | 10-1915765 B1 | 10/2018 |

* cited by examiner

100

METHOD AND APPARATUS FOR CONTINUOUS AUTHENTICATION

CROSS-REFERENCES TO RELATED APPLICATIONS

This is a continuation of International Application No. PCT/KR2020/001076, filed Jan. 22, 2020, which claims the benefits of Korean Patent Application No. 10-2019-0170112, filed on Dec. 18, 2019, and Korean Patent Application No. 10-2020-0008275, filed on Jan. 22, 2020.

TECHNICAL FIELD

The following description relates to an authentication technology for identifying the identity of a user.

BACKGROUND OF THE DISCLOSURE

Bio authentication (or fast identity online) is a technology using personal unique bio information, such as a fingerprint, an iris, a face, or a voice, in order to identify the identity of a user.

Fact recognition is one of commonly used bio authentication technologies, and is used in various security systems, such as a smart door, a smartphone, and a laptop computer by replacing the existing number key-based authentication system.

For example, Korean Patent No. 10-0809044 (registered on Feb. 25, 2008) discloses a contactless face authentication doorlock system for authenticating a registrant by photographing a face of a visitor.

A current authentication technology is a method of performing authentication on a user by requesting the user to bring his or her face close to a camera of a device.

However, the existing authentication technology has a disadvantage in that a user has to make efforts for closeup and has a problem in that user authentication is processed based on a different type of input, such as a photo, not a real face of the user.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

Embodiments provide an authentication method and apparatus capable of minimizing user efforts for authentication.

Embodiments provide an authentication method and apparatus capable of solving a fake authentication problem using a different type of input, such as a photo.

In an authentication method executed in a computer device, the computer device includes at least one processor configured to execute computer-readable instructions included in a memory. The authentication method includes receiving, by the at least one processor image frames taken by a camera in succession, detecting, by the at least one processor, a face area in the image frames, tracking, by the at least one processor, a change in a location of the detected face area in the image frames, and performing, by the at least one processor, continuous user authentication for the face area according to the change in the location by using the face area whose change in the location has been tracked and a deep learning model.

According to an aspect, the deep learning model may be trained by using data obtained by tracking the change in the location of the face area detected in the image frames and information of the user corresponding to the data.

According to another aspect, the authentication method may further include collecting, by the at least one processor, the image frames taken by the camera, the detected face area, and results of the user authentication, and retraining, by the at least one processor, the deep learning model by using the collected image frames, the collected face area, and the collected results of the user authentication.

According to still another aspect, retraining the deep learning model may include classifying the collected image frames, the collected face area into data successful in the user authentication and data failed in the user authentication based on the collected results of the user authentication, training the deep learning model by using, as correct answer data, image frames and a corresponding face area successful in the user authentication along with user ID information, and training the deep learning model by using, as incorrect data, image frames and a corresponding face area failed in the user authentication.

According to still another aspect, performing the continuous user authentication may include performing the continuous user authentication on the face area according to the change in the location through the face area whose change in the location has been tracked and the retrained deep learning model, after the deep learning model is retrained.

According to still another aspect, performing the continuous user authentication may include identifying a fake input using a photo by using the deep learning model.

A computer device includes at least one processor implemented to execute computer-readable instructions included in a memory. The at least one processor receives image frames taken by a camera in succession, detects a face area in the image frames, tracks a change in a location of the detected face area in the image frames, and performs continuous user authentication for the face area according to a change in a location by using the face area whose change in a location has been tracked and a deep learning model.

According to embodiments of the present disclosure, user convenience can be improved because user authentication can be processed without user efforts for closeup.

According to embodiments of the present disclosure, a fake authentication problem using a different type of input, such as a photo, can be effectively solved.

DESCRIPTION OF THE DRAWINGS

The foregoing aspects and many of the attendant advantages of this disclosure will become more readily appreciated as the same become better understood by reference to the following detailed description, when taken in conjunction with the accompanying drawings, wherein.

DETAILED DESCRIPTION

While illustrative embodiments have been illustrated and described, it will be appreciated that various changes can be made therein without departing from the spirit and scope of the disclosure.

Hereinafter, embodiments of the present disclosure are described in detail with reference to the accompanying drawings.

Embodiments of the present disclosure relate to an authentication technology for identifying the identity of a user.

Embodiments including contents specifically described in this specification can process user authentication without requiring user efforts for closeup and also solve a fake authentication problem using a different type of input, such as a photo. Accordingly, significant advantages in aspects, such as user convenience and security reinforcement, are achieved.

Figure 1:
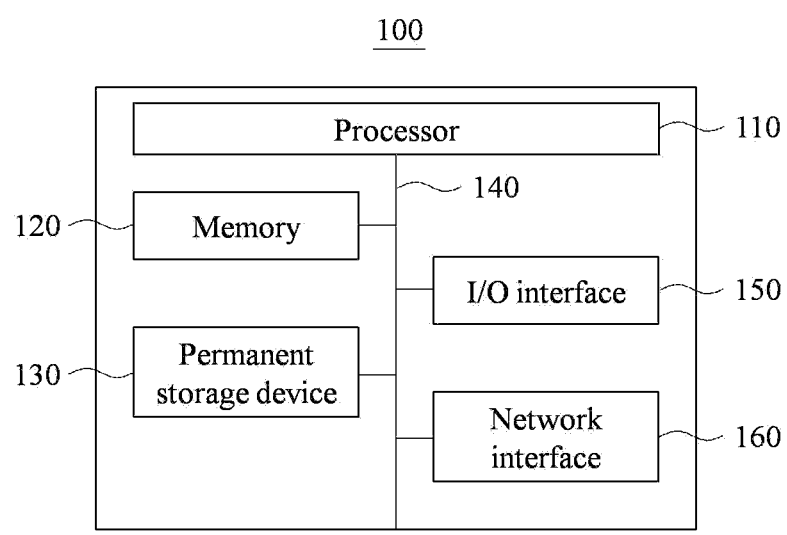
FIG. 1 is a block diagram for describing an example of internal components of a computer device in an embodiment of the present disclosure.

FIG. 1 is a block diagram for describing an example of internal components of a computer device in an embodiment of the present disclosure. For example, an authentication system according to embodiments of the present disclosure may be implemented through a computer device 100 of FIG. 1. As illustrating in FIG. 1, the computer device 100 may include a processor 110, a memory 120, a permanent storage device 130, a bus 140, an input/output (I/O) interface 150, and a network interface 160 as components for executing an authentication method.

The processor 110 is a component for authentication, and may include an arbitrary device capable of processing a sequence of instructions or may be a part of the arbitrary device. The processor 110 may include a computer processor, a mobile device or a processor and/or a digital processor within another electronic device, for example. The processor 110 may be included in a server computing device, a server computer, a series of server computers, a server farm, a cloud computer, or a content platform, for example. The processor 110 may be connected to the memory 120 through the bus 140.

The memory 120 may include a volatile memory, a permanent memory, a virtual memory or other memories for storing information which is used or outputted b y the computer device 100. The memory 120 may include a random access memory (RAM) and/or a dynamic RAM (DRAM), for example. The memory 120 may be used to store arbitrary information, such as state information of the computer device 100. The memory 120 may also be used to store instructions of the computer device 100, which include instructions for authentication, for example. The computer device 100 may include one or more processors 110, if necessary or if appropriated.

The bus 140 may have a communication-based structure which enables an interaction between various components of the computer device 100. The bus 140 may carry data between components of the computer device 100, for example, between the processor 110 and the memory 120. The bus 140 may include wireless and/or wired communication media between components of the computer device 100, and may include parallel, serial or other topology arrays.

The permanent storage device 130 may include components a memory or another permanent storage device, such as that used by the computer device 100 in order to store data for given extended period (e.g., compared to the memory 120). The permanent storage device 130 may include a non-volatile main memory, such as that used by the processor 110 within the computer device 100. The permanent storage device 130 may include a flash memory, a hard disc, an optical disc, or other computer-readable media, for example.

The I/O interface 150 may include interfaces for a keyboard, a mouth, a voice command input, a display, or other input or output devices. Configuration instructions and/or an input for authentication may be received through the I/O interface 150.

The network interface 160 may include one or more interfaces for networks, such as a short-distance network or the Internet. The network interface 160 may include interfaces for wired or wireless connections. Configuration instructions and/or an input for authentication may be received through the network interface 160.

Furthermore, in other embodiments, the computer device 100 may include more components than the components of FIG. 1. However, most of conventional components do not need to be clearly illustrated. For example, the computer device 100 may be implemented to include at least some of I/O devices connected to the I/O interface 150 or may further include other components, such as a transceiver, a global positioning system (GPS) module, a camera, various sensors, and a database.

The present embodiments relate to an authentication technology for identifying the identity of a user and, particularly, to an authentication technology.

Figure 2:
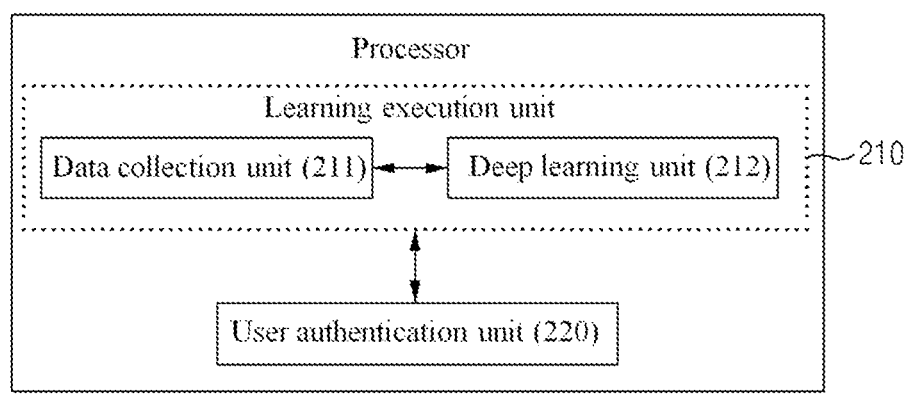
FIG. 2 is a diagram illustrating an example of components which may be included in the processor of the computer device according to an embodiment of the present disclosure.

FIG. 2 is a diagram illustrating an example of components which may be included in the processor of the computer device according to an embodiment of the present disclosure.

As illustrated in FIG. 2, the processor 110 may include a learning execution unit 210 and a user authentication unit 220. The learning execution unit 210 may include at least one of a data collection unit 211 and a deep learning unit 212 depending on an embodiment.

Such components of the processor 110 may be expressions of different functions performed by the processor 110 in response to a control command provided by at least one program code. For example, the learning execution unit 210 may be used as a function expression that operates in order for the processor 110 to control the computer device 100 so that the computer device 100 trains a deep learning model by using data related to authentication. The processor 110 and the components of the processor 110 may perform steps included in the following authentication method. For example, the processor 110 and the components of the processor 110 may be implemented to execute an instruction according to a code of an operating system included in the memory 120 and the aforementioned at least one program code. In this case, the at least one program code may correspond to a code of a program implemented to process the authentication method.

Figure 3:
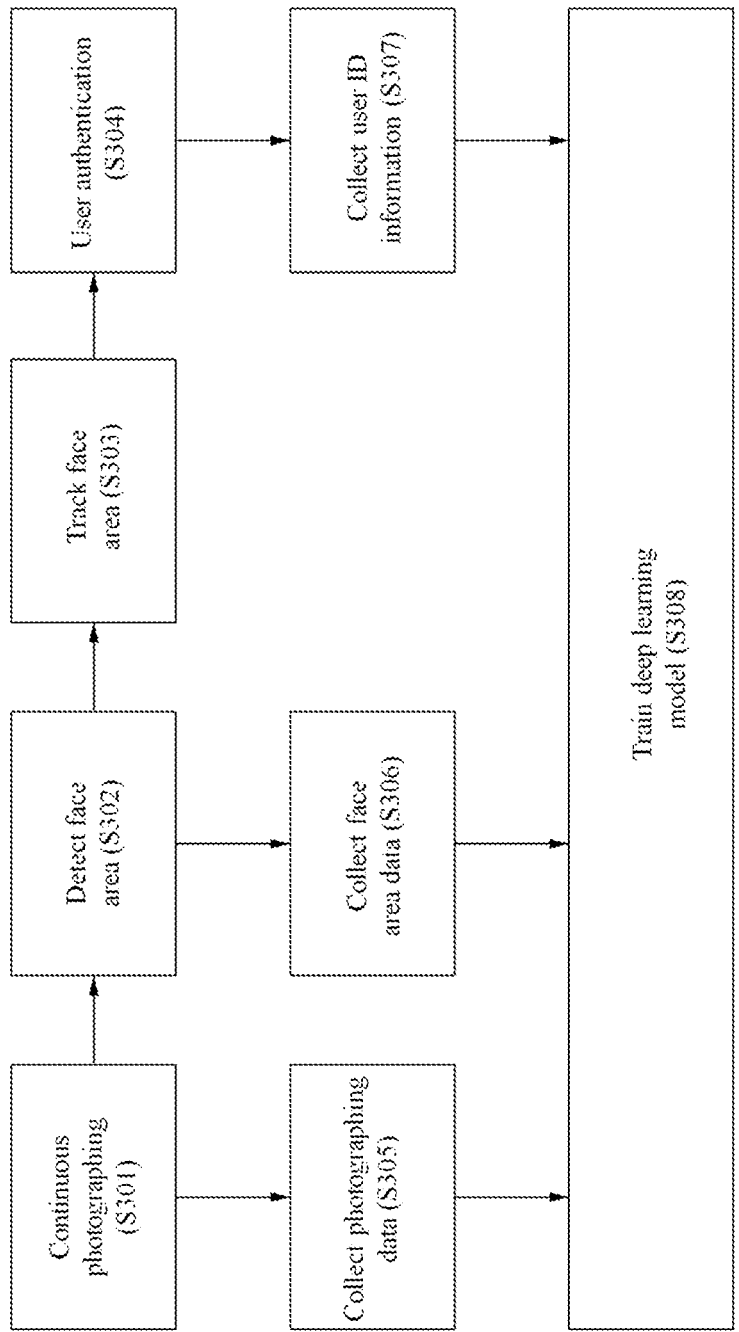
FIG. 3 is a flowchart illustrating an example of an authentication method which may be performed by the computer device according to an embodiment of the present disclosure.

FIG. 3 is a flowchart illustrating an example of an authentication method which may be performed by the computer device according to an embodiment of the present disclosure.

The authentication method of FIG. 3 may not occur in the illustrated sequence, and may omit some of the steps or may further include an additional process.

The processor 110 may load, onto the memory 120, a program code stored in a program file for the authentication method. For example, the program file for the authentication method may be stored in the permanent storage device 130 described with reference to FIG. 1. The processor 110 may control the computer device 100 so that the program code is loaded from the program file, stored in the permanent storage device 130, to the memory 120 through the bus. In this case, each of the processor 110, and the data collection unit 211, the deep learning unit 212, and the user authentication unit 220 included in the processor 110 may be a different function expression of the processor 110 for executing subsequent steps S301 to S308 by executing an instruction of a corresponding portion in the program code loaded onto the memory 120. In order to execute steps S301 to S308, the processor 110 and the components of the processor 110 may directly process an operation according to a control command or may control the computer device 100.

In step S301, the user authentication unit 220 may perform continuous photographing or periodic photographing on a user through a camera connected to the I/O interface 150. The user authentication unit 220 does not request separate the user's efforts for authentication, but may continuously photograph a face of the user in a situation in which the camera is turned on or may capture a face of the user through the camera at given intervals. Many services may be assumed at the moment when the face of the user is caught on the camera. For example, the user authentication unit 220 may continuously photograph the user in a situation in which the camera is always turned on like CCTV or may capture the user whenever the camera is turned on while a smartphone is used or periodically by turning on the camera. In addition to such continuous photographing or periodic photographing, the user authentication unit 220 may capture the user by turning on the camera when a predefined environment is detected through a sensor (e.g., a motion sensor, an infrared sensor, or a touch sensor) included in the computer device 100.

In step S302, the user authentication unit 220 may detect a face area of the user in an image captured in step S301. The user authentication unit 220 may detect a location where the face of the user is present in image frames through a face detection algorithm. For example, the user authentication unit 220 may generate a pyramid image in order to detect faces having various sizes in the image frames, and may then determine whether a corresponding area having a specific size (e.g., 20×20 pixels) is a face by using a classifier, such as a neural network, Adaboost, or Support Vector Machine, while moving by one pixel.

In step S303, the user authentication unit 220 may track a change in the location of the face area detected in step S302. The user authentication unit 220 may track a change in the face area based on similarity between pieces of characteristic information, such as the size, color, shape, and contour line of the face area within a series of image frames, through a face tracking algorithm.

In step S304, the user authentication unit 220 may perform user authentication based on the face area tracked in step S303. The user authentication unit 220 may continuously or periodically authenticate the user while tracking the face of the user through continuous photographing or periodic photographing. The user authentication unit 220 may authenticate the user by comparing the tracked face area with a face database (DB) previously registered with the memory 120. Accordingly, the user authentication unit 220 may perform the user authentication without separate user efforts at timing at which the user needs to be authenticated. Accordingly, a user can be authenticated whenever a face of the user is caught on the camera even in a situation in which the user does not make efforts for authentication without requiring separate user efforts for authentication.

The learning execution unit 210 can improve a system by collecting data related to authentication whenever a face of a user is caught on the camera and training the deep learning model based on the collected data.

In step S305, the data collection unit 211 may collect photographing data, that is, the image captured by the camera in step S301, as learning data for model training.

In step S306, the data collection unit 211 may collect face area data, that is, the face area detected in step S302, as learning data for model training.

In step S307, the data collection unit 211 may collect user authentication result data, that is, user ID information successful in the user authentication in step S304, as learning data for model training.

In step S308, the deep learning unit 212 may train the deep learning model for user authentication by using the photographing data, the face area data, and the user authentication result data collected as the learning data for model training. The deep learning unit 212 may classify the photographing data and the face area data, collected as the learning data for model training, into data successful in the user authentication and data failed in the user authentication. In this case, when the user authentication is successful, the deep learning unit 212 may classify data including user ID information as data successful in the user authentication, and may learn, as correct answer data, photographing data and face area data successful in the user authentication along with corresponding user ID information. When the user authentication fails, the deep learning unit 212 may classify data, not including user ID information, as data failed in the user authentication, and may learn, as incorrect data, photographing data and face area data failed in the user authentication.

Thereafter, the user authentication unit 220 may perform user authentication by using the deep learning model trained in step S308 without requiring separate user efforts at timing at which the user authentication is necessary.

For example, a user is not authenticated through additional efforts of the user at a smart door attached to a door, but a camera attached to the smart door can continuously authenticate the user who walks down a corridor by recognizing the user far away. When an actual user arrives at the door, whether the user enters the door can be determined by already recognizing the user.

In order to more accurately recognize a face of a user at a remote distance, a region of interest (ROI) may be cropped as a candidate area where a person is likely to be present in image frames, and may be used as an input for detecting the face of the user.

In particular, the user authentication unit 220 can provide a more robust authentication environment because a different type of input, such as a photo, can be determined as a fake by performing user authentication through the deep learning model trained based on photographing data, face area data, and user authentication result data.

The deep learning model may be first trained by using data collected according to a static authentication method. As described above, the static authentication method may be a method of performing authentication on a user by requesting the user to bring his or her face close to a camera of a device. Such a static authentication method may request closeup for a face of a user from the user. The system may operate according to the static authentication method for a given period, and may authenticate users based on faces of the users. The system may train the deep learning model for the first time by using data collected for the period as learning data. Thereafter, the users may be authenticated according to the authentication method according to the aforementioned embodiments of the present disclosure by using the deep learning model trained for the first time. Authentication using the static authentication method may be requested from even a user who has not been authenticated by the authentication method according to embodiments of the present disclosure.

As described above, according to embodiments of the present disclosure, user convenience can be improved because user authentication can be processed without user efforts for closeup. Furthermore, according to embodiments of the present disclosure, a fake authentication problem using a different type of input, such as a photo, can be effectively solved.

The aforementioned device may be implemented as a hardware component, a software component, or a combination of a hardware component and a software component. For example, the device and component described in the embodiments may be implemented using a processor, a controller, an arithmetic logic unit (ALU), a digital signal processor, a microcomputer, a field programmable gate array (FPGA), a programmable logic unit (PLU), a microprocessor, or one or more general-purpose computers or special-purpose computers, such as any other device capable of executing or responding to an instruction. The processing device may perform an operating system (OS) and one or more software applications executed on the OS. Furthermore, the processing device may access, store, manipulate, process and generate data in response to the execution of software. For convenience of understanding, one processing device has been illustrated as being used, but a person having ordinary skill in the art may understand that the processing device may include a plurality of processing elements and/or a plurality of types of processing elements. For example, the processing device may include a plurality of processors or a single processor and a single controller. Furthermore, a different processing configuration, such as a parallel processor, is also possible.

Software may include a computer program, a code, an instruction or a combination of one or more of them and may configure a processing device so that the processing device operates as desired or may instruct the processing devices independently or collectively. The software and/or the data may be embodied in any type of machine, a component, a physical device, a computer storage medium or a device in order to be interpreted by the processing device or to provide an instruction or data to the processing device. The software may be distributed to computer systems connected over a network and may be stored or executed in a distributed manner. The software and the data may be stored in one or more computer-readable recording media.

The method according to an embodiment may be implemented in the form of a program instruction executable by various computer means and stored in a computer-readable medium. In this case, the medium may continue to store a program executable by a computer or may temporarily store the program for execution or download. Furthermore, the medium may be various recording means or storage means having a form in which one or a plurality of pieces of hardware has been combined. The medium is not limited to a medium directly connected to a computer system, but may be one distributed over a network. An example of the medium may be one configured to store program instructions, including magnetic media such as a hard disk, a floppy disk and a magnetic tape, optical media such as a CD-ROM and a DVD, magneto-optical media such as a floptical disk, a ROM, a RAM, and a flash memory. Furthermore, other examples of the medium may include an app store in which apps are distributed, a site in which other various pieces of software are supplied or distributed, and recording media and/or storage media managed in a server.

As described above, although the embodiments have been described in connection with the limited embodiments and the drawings, those skilled in the art may modify and change the embodiments in various ways from the description. For example, proper results may be achieved although the aforementioned descriptions are performed in order different from that of the described method and/or the aforementioned elements, such as the system, configuration, device, and circuit, are coupled or combined in a form different from that of the described method or replaced or substituted with other elements or equivalents.

Accordingly, other implementations, other embodiments, and the equivalents of the claims fall within the scope of the claims.

The embodiments of the disclosure in which an exclusive property or privilege is claimed are defined as follows:

1. An authentication method executed in a computer device, wherein the computer device comprises at least one processor configured to execute computer-readable instructions included in a memory, and
wherein the authentication method comprises:
receiving, by the at least one processor, image frames taken by a camera in succession;
detecting, by the at least one processor, a face area in the image frames;
tracking, by the at least one processor, a change in a location of the detected face area in the image frames; and
performing, by the at least one processor, continuous user authentication for the face area according to the change in the location by using the face area whose change in the location has been tracked and a deep learning model;
wherein the authentication method further comprises:
collecting, by the at least one processor, the image frames taken by the camera, the detected face area, and results of the user authentication; and
retraining, by the at least one processor, the deep learning model by using the collected image frames, the collected face area, and the collected results of the user authentication; and
wherein retraining the deep learning model comprises:
classifying the collected image frames, the collected face area into data successful in the user authentication and data failed in the user authentication based on the collected results of the user authentication;
training the deep learning model by using, as correct answer data, image frames and a corresponding face area successful in the user authentication along with user ID information; and
training the deep learning model by using, as incorrect data, image frames and a corresponding face area failed in the user authentication.

2. The authentication method of claim 1, wherein the deep learning model is trained by using data obtained by tracking the change in the location of the face area detected in the image frames and information of the user corresponding to the data.

3. The authentication method of claim 1, wherein performing the continuous user authentication comprises performing the continuous user authentication on the face area whose change in the location has been tracked and the face area according to the change in the location through the retrained deep learning model, after the deep learning model is retrained.

4. The authentication method of claim 1, wherein performing the continuous user authentication comprises identifying a fake input using a photo by using the deep learning model.

5. The authentication method of claim 1, further comprising processing, by the at least one processor, the user authentication by using a static authentication method which requests closeup for the face of the user when the continuous user authentication fails.

6. The authentication method of claim 1, wherein detecting the face area comprises detecting the face area by cropping a region of interest (ROI) corresponding to a person candidate area in the image frames.

7. The authentication method of claim 1, wherein detecting the face area comprises:
generating a pyramid image from the image frames; and
detecting the face area in the pyramid image.

8. A computer device comprising:
at least one processor implemented to execute computer-readable instructions included in a memory,
wherein the at least one processor
receives image frames taken by a camera in succession,
detects a face area in the image frames,
tracks a change in a location of the detected face area in the image frames, and
performs continuous user authentication for the face area according to a change in a location by using the face area whose change in a location has been tracked and a deep learning model,
wherein the at least one processor
collects the image frames taken by the camera, the detected face area, and results of the user authentication, and
retrains the deep learning model by using the collected image frames, the collected face area, and the collected results of the user authentication, and
wherein in order to retrain the deep learning model, the at least one processor
classifies the collected image frames and the collected face area into data successful in the user authentication and data failed in the user authentication based on the collected results of the user authentication,
trains the deep learning model by using, as correct answer data, image frames and a corresponding face area successful in the user authentication along with user ID information, and
trains the deep learning model by using, as incorrect data, image frames and a corresponding face area failed in the user authentication.

9. The computer device of claim 8, wherein the deep learning model is trained by using data obtained by tracking the change in the location of the face area detected in the image frames and information of the user corresponding to the data.

10. The computer device of claim 8, wherein in order to perform the continuous user authentication, the at least one processor performs the continuous user authentication on the face area according to the change in the location through the face area whose change in the location has been tracked and the retrained deep learning model, after the deep learning model is retrained.

11. The computer device of claim 8, wherein in order to perform the continuous user authentication, the at least one processor identifies a fake input using a photo by using the deep learning model.

12. The computer device of claim 8, wherein the at least one processor processes the user authentication by using a static authentication method which requests closeup for the face of the user when the continuous user authentication fails.

13. The computer device of claim 8, wherein in order to detect the face area, the at least one processor detects the face area by cropping a region of interest (ROI) corresponding to a person candidate area in the image frames.

14. The computer device of claim 8, wherein in order to detect the face area, the at least one processor
generates a pyramid image from the image frames, and
detects the face area in the pyramid image.

* * * * *